(12) United States Patent
Luo

(10) Patent No.: US 9,986,389 B2
(45) Date of Patent: *May 29, 2018

(54) METHOD AND SYSTEM FOR PROCESSING INFORMATION

(71) Applicant: Alibaba Group Holding Limited, George Town, Grand Cayman (KY)

(72) Inventor: Yunguang Luo, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/655,713

(22) Filed: Jul. 20, 2017

(65) Prior Publication Data

US 2017/0325077 A1   Nov. 9, 2017

Related U.S. Application Data

(63) Continuation of application No. 14/988,458, filed on Jan. 5, 2016, now Pat. No. 9,763,065.

(30) Foreign Application Priority Data

Jan. 20, 2015 (CN) .......................... 2015 1 0029046

(51) Int. Cl.
*H04W 4/02* (2018.01)
*H04W 4/08* (2009.01)

(52) U.S. Cl.
CPC ............. *H04W 4/08* (2013.01); *H04W 4/021* (2013.01); *H04W 4/025* (2013.01); *H04W 4/026* (2013.01)

(58) Field of Classification Search
CPC . H04W 4/026; H04W 64/006; H04W 64/003; H04W 40/244; H04W 88/08; H04W 4/043; H04W 72/046
USPC .................. 455/414.2, 411, 419, 418, 456.1; 701/211; 340/384.1
See application file for complete search history.

(56) References Cited

U.S. PATENT DOCUMENTS

2008/0119160 A1* 5/2008 Andriantsiferana .. H04M 15/00
455/406
2010/0210240 A1* 8/2010 Mahaffey ............ H04L 41/0253
455/411

* cited by examiner

*Primary Examiner* — Phuoc H Doan
(74) *Attorney, Agent, or Firm* — Shun Yao; Park, Vaughan, Fleming & Dowler LLP

(57) ABSTRACT

One embodiment of the present invention provides a system for transmitting information. During operation, the system receives, by a server from an initial mobile device, a request for transmitting information. The request does not specify a recipient for the information. The system obtains location and/or orientation information associated with the initial mobile device and location and/or orientation information associated with a plurality of mobile devices. The system selects from the plurality of mobile devices a subset of mobile devices based on the location and/or orientation information associated with the initial mobile device and the location and/or orientation information associated with the plurality of mobile devices, and transmits the information to the selected subset of mobile devices.

20 Claims, 10 Drawing Sheets

| MOBILE DEVICES | GROUP NO. | RELATIVE LOCATION | NUMBER OF DEVICES IN GROUP | GROUP AMOUNT | MEMBER AMOUNT |
|---|---|---|---|---|---|
| A | 001 | EAST | 2 | $1000 | $100 |
| B | | | | | $900 |
| C | 002 | NORTH-EAST | 300 | $60000 | $200 |
| D | | | | | $200 |
| ⋮ | | | | | ⋮ |
| ⋮ | | | | | ⋮ |

FIG. 8

METHOD AND SYSTEM FOR PROCESSING INFORMATION

RELATED APPLICATION

This application is a continuation of U.S. application Ser. No. 14/988,458, entitled "METHOD AND SYSTEM FOR PROCESSING INFORMATION," by inventors Yunguang Luo, filed 5 Jan. 2016, which claims the benefit and right of priority of Chinese Patent Application No. 201510029046.0, filed 20 Jan. 2015.

BACKGROUND

Field

The present application relates to a method and system for discovering and grouping users of a service. More specifically, this application relates to a method and a system that groups users based on the location and orientation of a mobile device.

Related Art

With the rapid development of mobile computing technology, usage of mobile applications (commonly referred to as apps) has become increasingly prevalent across mobile phone users. Many marketers have turned to mobile apps when they try to reach a large audience. Accordingly, many apps have been developed for marketing purposes. For example, WeChat (a mobile text and voice messaging communication service developed by Tencent Inc. of China) provides a red envelope function that allows marketers to give away cash or coupons to users in order to promote their brand. Taobao and Tmall (Taobao and Tmall are the online shopping websites operated by Alibaba Group of China) also provide similar mobile apps that can be used as a promotion platform for marketers.

One popular function of the red envelope app is the "red envelope fission," which allows a user to turn a received red envelope (which may contain a predetermined amount of cash reward) into multiple red envelopes that can be distributed to other users. A marketer can effectively reach a larger audience through the propagation of the red envelopes. Similarly, a marketer may want to distribute promotional materials (e.g., cash rewards or merchandise coupons) to a selected group of users.

These aforementioned apps and other similar apps require the ability of the server to select, from a large number of users, a group of users, and to allow the selected users to exchange information with the server as a group. To ensure successful and reliable information exchange, the number of users within the group needs to be limited. If the number of users in a particular group exceeds a predetermined threshold, information transmission errors may occur.

Conventional approaches, such as the "red envelope fission" app, rely on geographic range to group users and to limit the number of users in a group. For example, the "red envelope fission" app typically requires that the receiver of a red envelope share fissioned red envelopes with users in his vicinity. Similarly, a marketer may distribute a merchandise coupon to users at a particular geographic location, such as within a one-mile radius. Because only a limited number of users can co-exist in a particular geographic location, that location information can be used to limit the user number in a group. The geographic or spatial information of users can be extracted from the global positioning system (GPS) modules in the mobile devices carried by the users. Because most civilian GPS modules have limited accuracy, some apps may place users having the same GPS reading in a group. For example, the precision range of the GPS in a typical mobile device can be around 15 meters; users within the 15-meter radius will have the same GPS readings and will, thus, be assigned to the same group.

However, grouping users in the same geographic location has limitations. Some applications may require a group to include users at different geographic locations. For example, a user using the "red envelope fission" app may wish to distribute the fissioned red envelopes to his friends living in a different city. Moreover, a marketer may want to distribute promotional materials to a group of users randomly selected from different cities. The conventional location-based grouping approaches do not provide sufficient flexibility in these situations.

SUMMARY

One embodiment of the present invention provides a system for transmitting information. During operation, the system receives, by a server from an initial mobile device, a request for transmitting information. The request does not specify a recipient for the information. The system obtains location and/or orientation information associated with the initial mobile device and location and/or orientation information associated with a plurality of mobile devices. The system selects from the plurality of mobile devices a subset of mobile devices based on the location and/or orientation information associated with the initial mobile device and the location and/or orientation information associated with the plurality of mobile devices, and transmits the information to the selected subset of mobile devices.

In a variation on this embodiment, selecting the subset of mobile devices involves defining a region based on the location and orientation of the initial mobile device and identifying mobile devices located within the defined region.

In a further variation, defining the region involves: using the location of the initial mobile device as an origin, defining a first ray in a horizontal plane, wherein the first ray starts from the origin and aligns to the orientation of the initial mobile device, and defining the region in a such a way that an angle formed between the first ray and a straight line connecting any point in the region and the origin is less than a predetermined threshold.

In a variation on this embodiment, selecting the subset of mobile devices involves: using the location of the initial mobile device as an origin, dividing a horizontal plane into a plurality of predefined zones having a common vertex at the origin, and identifying mobile devices located within one or more predetermined zones.

In a variation on this embodiment, selecting the subset of mobile devices further involves determining an association between a respective mobile device and the initial mobile device.

In a variation on this embodiment, selecting the subset of mobile devices involves identifying mobile devices whose orientation is substantially same as the orientation of the initial mobile device.

In a variation on this embodiment, the information includes information for distributing resources. The system further places the selected subset of mobile devices into a group, provisions resources for the group based on a total number of mobile devices in the group, and provisions resources for each mobile device in the group.

BRIEF DESCRIPTION OF THE FIGURES

FIG. 8 presents a diagram illustrating a resource-provisioning example, in accordance with an embodiment of the present invention.

In the figures, like reference numerals refer to the same figure elements.

DETAILED DESCRIPTION

Figure 1:
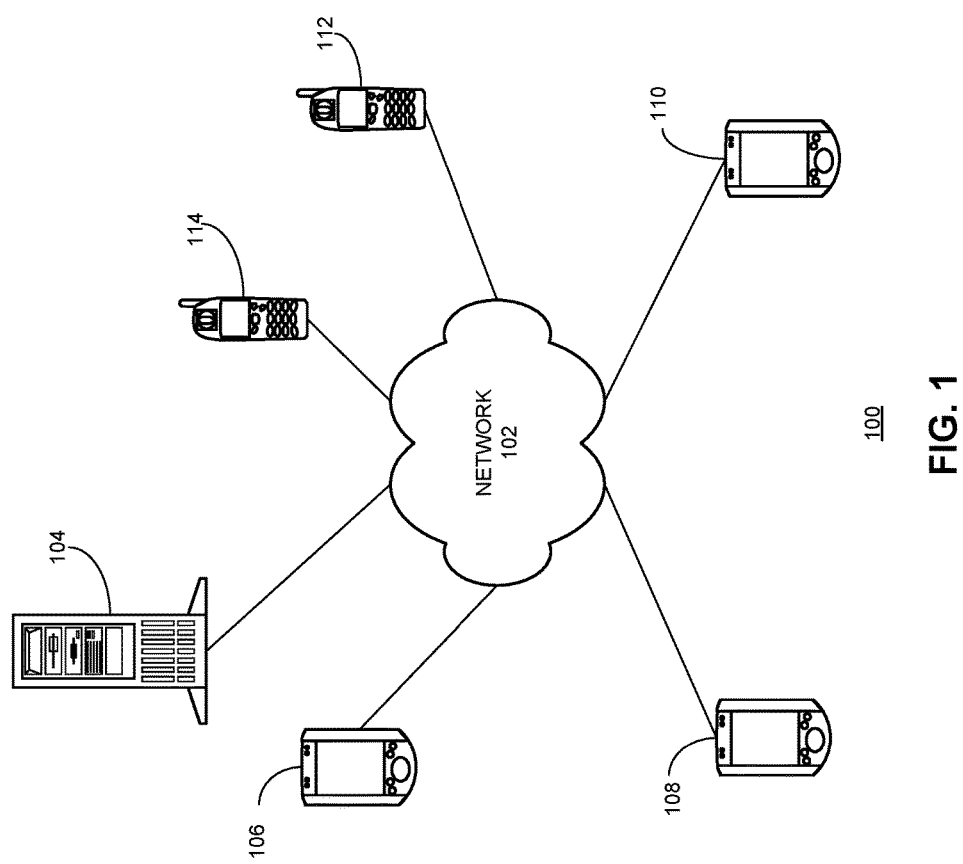
FIG. 1 presents a diagram illustrating an exemplary information-transmitting system, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide an information processing system that can group users at different geographic locations together to allow them to share a common resource, which can include real money or virtual currency. More specifically, a local user can select a remote user to join the resource-sharing by pointing the local user's mobile device toward the direction of the remote user, or by orienting the local user's mobile device in the same orientation as the remote user's mobile device. While selecting the remote user to join the group, the local user does not need to provide explicit information that can be used to identify the remote user.

Information-Transmitting System

Many mobile applications are designed to facilitate the propagation of information. More specifically, some mobile applications are designed to have information receivers (users) to relay information to other users, such as people on their contact list. It has been shown that people tend to be influenced more by information sent by people they know. Therefore, instead of mass emailing, marketers may prefer to rely on initial receivers of their promotional materials to forward those materials to other users. Conventional information-forwarding schemes, such as email or message forwarding, often require the forwarder to specify the forwarding destinations (e.g., the address or identification of the recipient). This can be troublesome to the forwarder, thus hindering his willingness to forward the information. To overcome such an obstacle, many mobile applications allow the user to use simple hand motions to forward received information. Some mobile applications can detect a user's surrounding friends, and the user can forward the received information to his surrounding friends by simply shaking his mobile device or tapping its screen. The user does not need to input identification information of the recipients. For example, the popular red envelope fission app allows a user to multiply a received red envelope and to distribute the multiplied red envelopes to his surrounding friends by simply tapping the received red envelope displayed on the screen.

However, this limits the information forwarding to the vicinity of the initial receiver. If a user wanted to forward received information to friends at a remote location using the app (i.e., in a way that does not require specifying the recipient), he would not be able to do so. To solve this problem, some embodiments of the present invention provide a novel information-propagation (or information-transmitting) system that enables a user to forward information to remote recipients without specifying who those remote recipients are. More specifically, the novel information-transmitting system may use orientation information associated with mobile devices to identify and select information recipients.

FIG. 1 presents a diagram illustrating an exemplary information-transmitting system, in accordance with an embodiment of the present invention. In FIG. 1, information-transmitting system 100 includes a network 102, a server 104, and a number of mobile devices, including mobile devices 106, 108, 110, 112, and 114.

Server 104 can be a physical server that includes a standalone computer, a virtual server provided by a cluster of standalone computers, or a cloud server. During operation, server 104 is responsible for coordinating the propagation of information. Server 104 can group a plurality of coupled mobile devices into a single group based on one or more predefined criteria and enable information exchange among group members without specifying the users of the mobile devices. Server 104 can also allow mobile devices in the same group to communicate with a server as a group. In other words, those predefined criteria do not concern the identity of the users of the mobile devices.

Network 102 can include various types of wired to wireless networks. In some embodiments, network 102 can include the public switched telephone network (PSTN) and the Internet. Mobile devices 106-114 can include various computing devices, including but not limited to: smartphones, tablet computers, laptop computers, personal digital assistants (PDAs), various wearable computing device (e.g., smart glasses and watches), etc.

During operation, server 104 can receive a request from a mobile device (e.g., mobile device 106) for transmitting information to other mobile devices. Unlike conventional information-forwarding requests that specify the intended recipients (either through addresses or user identifications), the request sent by mobile device 106 does not specify any particular recipients. Instead, the request sent by mobile device 106 can specify one or more criteria that can be used by server 104 for selecting the receiving mobile devices. In some embodiments, the criteria can include, but are not limited to: the orientation of the current mobile device and the location of the candidate mobile device, the locations of both the current mobile device and the candidate mobile device, and the orientations of both the current mobile device and the candidate mobile device. The request can further include the current location and orientation of the requesting mobile device. For example, prior to sending the request, mobile device 106 may need to call its various internal location and orientation sensors (e.g., GPS, accelerometer, gyroscope, and/or electronic compass) to obtain the current location and orientation data of mobile device 106. Such location and orientation information can be used by server 104 for selecting receiving mobile devices.

The orientation of a mobile device can be defined as a direction pointing from one end of the mobile device that is closer to the user to the other end of the mobile device that is farther away from the user under normal conditions. Alternatively, the orientation of a mobile device can be aligned along the longitudinal axis of the mobile device, pointing from the end closer to the user to the end away from the user. For example, if the mobile device is a smartphone or a tablet computer, the orientation of the device when the user is operating on its touchscreen is typically in a direction that points from the bottom of the device to the top of the device. Note here the bottom and the top of the device are typically predefined by the manufacturer of the mobile device. The orientation of the mobile device can also be related to the user's device holding habit. When operating on the touchscreen of a mobile device, some users may hold the device upright, whereas some users may hold the device substantially horizontally or place the device on a horizontal plane, such as a desk surface. When a user is holding the device substantially vertically, the orientation of the device can be same as a direction faced by the user. For example, given that a user is facing east and is operating on the touchscreen of a mobile device, one can determine that the orientation of the mobile device is pointing to the east. There are other ways to define the orientation of the mobile device. For example, the orientation of a mobile device can also be defined as an extension along its lateral direction or along any other reasonable directions (e.g., a vertical direction). For simplicity, in this disclosure, the orientation of the device refers to how the device is placed in the horizontal plane. If the device is tilted, its orientation can be determined by projecting the device onto the horizontal plane. However, the way that the orientation of a mobile device is defined does not limit the scope of this disclosure.

Both accelerometers and gyroscopes can provide position information associated with a device. Unlike an accelerometer that only measures linear accelerations, a gyroscope can better measure the deflection and rotational movements of a mobile device, and thus is capable of providing precise analysis of the user's actual movements. Depending on the type of mobile device, the orientation information of a mobile device can be provided by either an accelerometer or a gyroscope. In addition, certain advanced mobile devices may implement an electronic compass that can provide precise orientation information. The preferred electronic compass can include a three-axis compass with tilt compensation, which can provide substantially precise orientation information even when the compass is tilted.

When in operation, the orientation detection modules (e.g., accelerometers, gyroscopes, and electronic compasses) can detect in real time an angle formed between the current orientation of the mobile device and known directions, such as east, west, south, and north. Hence, the orientation information can include a reference direction and an angle. For example, the orientation of a mobile device can be defined as "north," "10 degrees east of north," "south," "20 degrees east of south," etc. Alternatively, the orientation information can include an azimuth angle. Other approaches for expressing a mobile device's orientation are also possible. In some embodiments, the system can define a ray whose initial point is the current location of the mobile device and whose direction is along the orientation of the mobile device. Such a ray is referred to as a "first" ray or a "reference" ray and can be used to express the orientation of the mobile device. The system can further determine a function for expressing the first ray based on both the latitudinal and longitudinal (or horizontal and vertical) coordinates of an existing map, and use this function to carry the orientation information.

Figure 2:
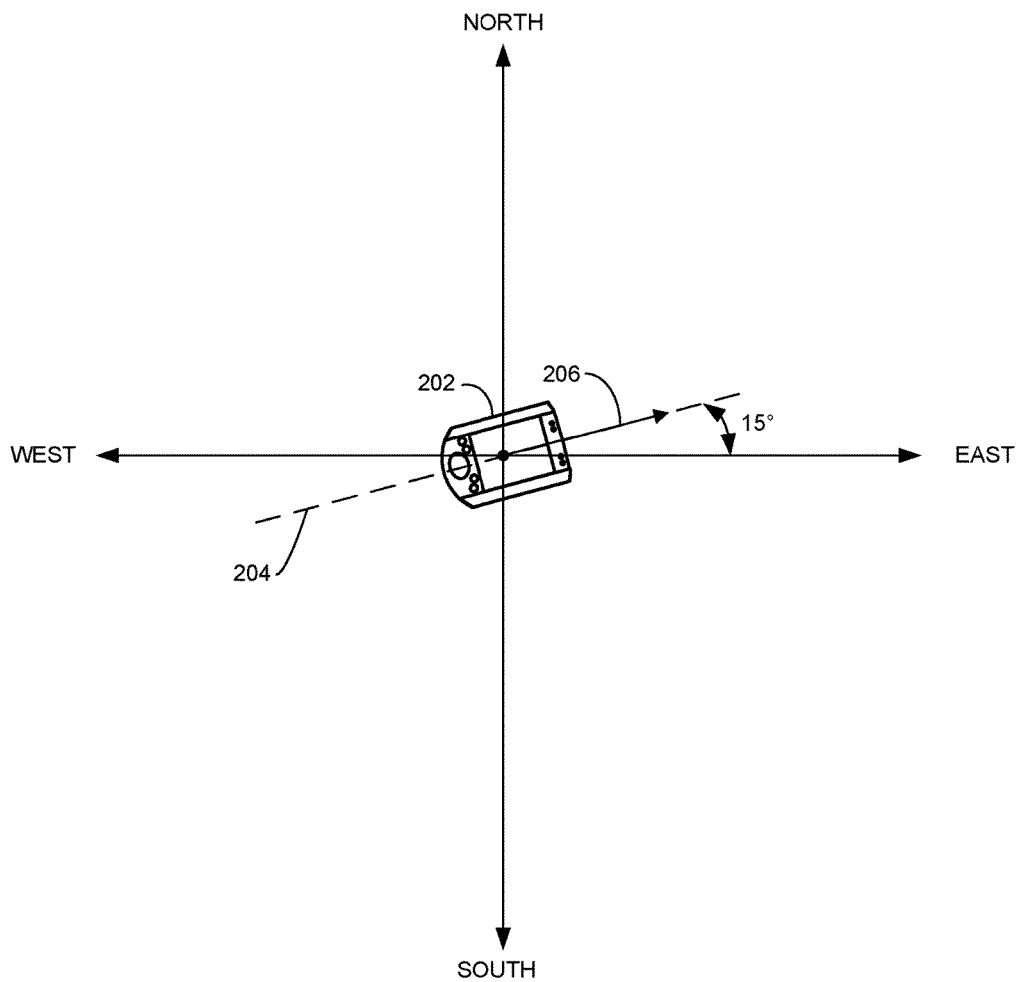
FIG. 2 illustrates the various approaches for expressing the orientation of a mobile device, in accordance with an embodiment of the present invention.

FIG. 2 illustrates the various approaches for expressing the orientation of a mobile device, in accordance with an embodiment of the present invention. In FIG. 2, a smartphone 202 is placed in such a way that its longitudinal axis (as indicated by dashed line 204) forms a 15° angle with a straight line pointing to the east. As discussed previously, the orientation of mobile device 202 is in a direction pointing from the bottom of mobile device 202 to the top of mobile device 204, as indicated by arrow 206. Arrow 206 can also be used to represent the aforementioned reference ray, and a function that uses the horizontal and vertical coordinates of a map to describe arrow 206 can be used to indicate the orientation associated with mobile device 202. Alternatively, the orientation of mobile device 202 can be expressed as "15° north of east," or by an azimuth of 85°.

The to-be-transmitted information can include but is not limited to: information that can cause the exchange of monetary gifts, virtual currencies, marketing materials (e.g., advertisements, coupons, etc.), and various digital information (e.g., text, photos, video and audio files, etc.). Note that, to enable the exchange of monetary gifts, the mobile devices need to be linked to financial accounts (e.g., bank accounts, credit cards, etc.) associated with their users. For example, the monetary amount included in a red envelope may be transferred into the user's bank account.

In some embodiments, upon the user of mobile device 106 indicating his intention to send an information-transmitting request, mobile device 106 calls the corresponding location and orientation sensors to obtain location and orientation information associated with mobile device 106, generates a request by including the location and orientation information, and sends the request to server 104. The user of mobile device 106 can perform one or more operations on mobile device 106 to indicate his intention to send the request. The operations can include, but are not limited to: pressing a button, flipping a switch, starting an app, inputting a voice control, shaking the device, making a selection on the touchscreen, etc. In general, the user only needs to perform a simple operation in order to trigger the request-sending event. The user does not need to specify the recipient of the information.

Upon receiving the information-transmitting request, server 104 can select one or more coupled mobile devices as the receiving device. Note that, in order to determine the receiving devices, server 104 needs to have the up-to-date location and orientation information of the other coupled mobile devices. In some embodiments, server 104 may query other mobile devices for their location and/or orientation in response to receiving an information-transmitting request. In some embodiments, the mobile devices may periodically update their location and orientation information to server 104. Alternatively, certain user operations (e.g., the opening of an app) can also trigger the mobile devices updating their location and orientation to server 104. In some embodiments, server 104 can also obtain the location information of the mobile device through a third-party system. For example, base stations in a cellular network can track the location of a mobile phone based on radio signals exchanged between the mobile device and the cell towers. Hence, server 104 may obtain the location information of coupled mobile phones from the service provider of these mobile phones. Alternatively, server 104 may also obtain the location information associated with the mobile devices from a GPS system, to which the mobile devices register their locations. If server 104 can obtain the location information of the mobile devices from a third-party system, the information-transmitting request no longer needs to carry the location information of the requesting mobile device.

Based on the location and/or orientation information associated with the coupled mobile devices, server 104 can select the mobile devices to receive the transmitted information. In some embodiments, server 104 may select receiving mobile devices based on the orientation of the transmitting mobile device and the location of the receiving devices. For example, if the transmitting mobile device is pointed toward a certain direction (e.g., north), server 104 may select a mobile device located in that direction (e.g., north of the transmitting device) as the receiving mobile device. To do so, the server may first determine the location of a candidate mobile device, and then determine whether the transmitting mobile device is pointed toward the candidate mobile device based on locations of both devices and the orientation of the transmitting device.

Figure 3A:
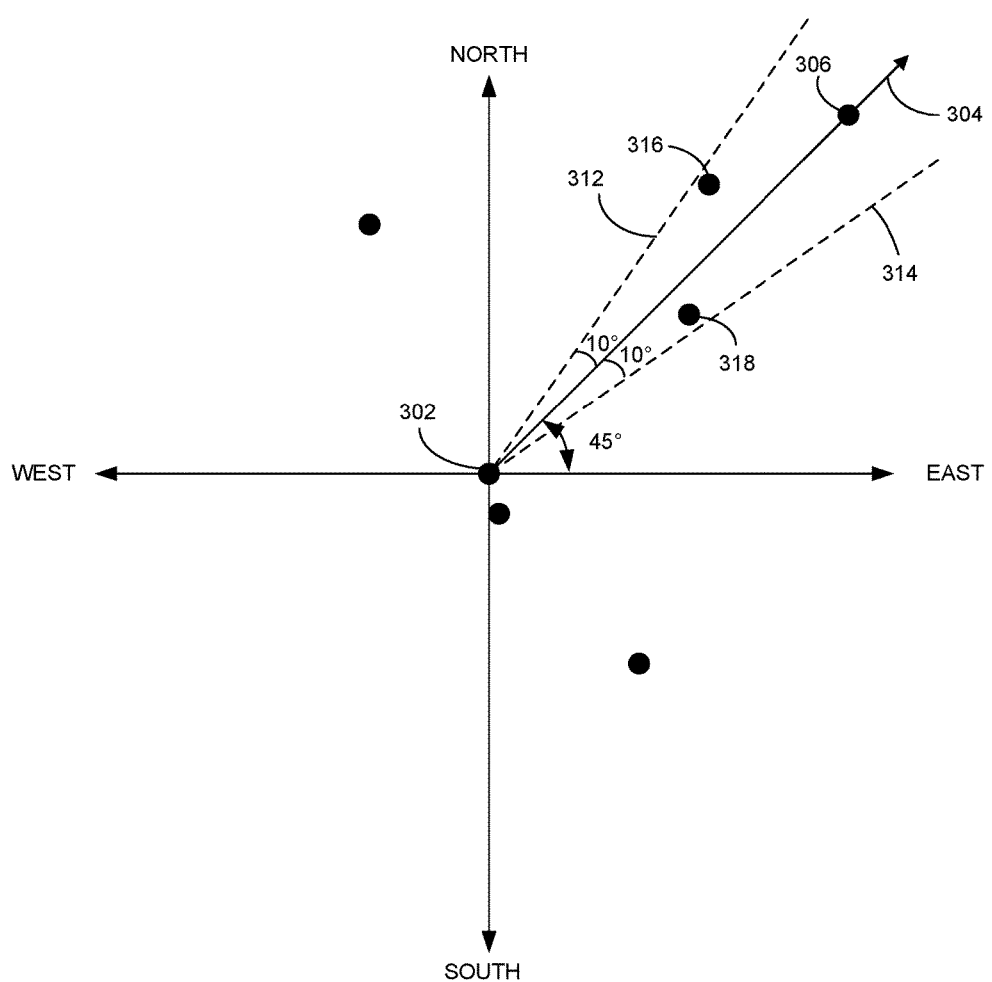
FIG. 3A presents a diagram illustrating one approach for selecting receiving mobile devices, in accordance with an embodiment of the present invention.

FIG. 3A presents a diagram illustrating one approach for selecting receiving mobile devices, in accordance with an embodiment of the present invention. In FIG. 3A, the black dots represent mobile devices coupled to the server. In the example, mobile device 302 is the transmitting device, and arrow 304 (also known as the reference ray) starting from mobile device 302 indicates the orientation of mobile device 302, which is north-east (or 45° north of east).

In some embodiments, a server may select receiving devices based on whether a device is on the path of the reference ray (arrow 304) associated with the transmitting device. In the example shown in FIG. 3A, mobile device 306 is on the path of reference ray 304, and hence will be selected by the server as a receiving device. As one can imagine, the likelihood of other mobile devices being exactly on the path of reference ray 304 can be small. In some embodiments, the server may select receiving devices that are adjacent, within a predetermined range, to reference ray 304. The range can be defined by an angle or a distance. In the example shown in FIG. 3A, the system may define additional rays 312 and 314 on either side of reference ray 304. These additional rays have the same initial point as reference ray 304, and each forms a small angle (e.g., a 10° angle) with reference ray 304. In other words, these additional rays are pointed to a direction that is close to (within a predetermined range) to the orientation of transmitting mobile device 302. In FIG. 3A, the predetermined range is 10°. Other ranges are also possible, and can be defined either by the user sending the information-transmitting request or by the server. Any mobile device positioned between additional rays 312 and 314 (e.g., mobile device 316 or 318) can be selected as a receiving mobile device.

Figure 3B:
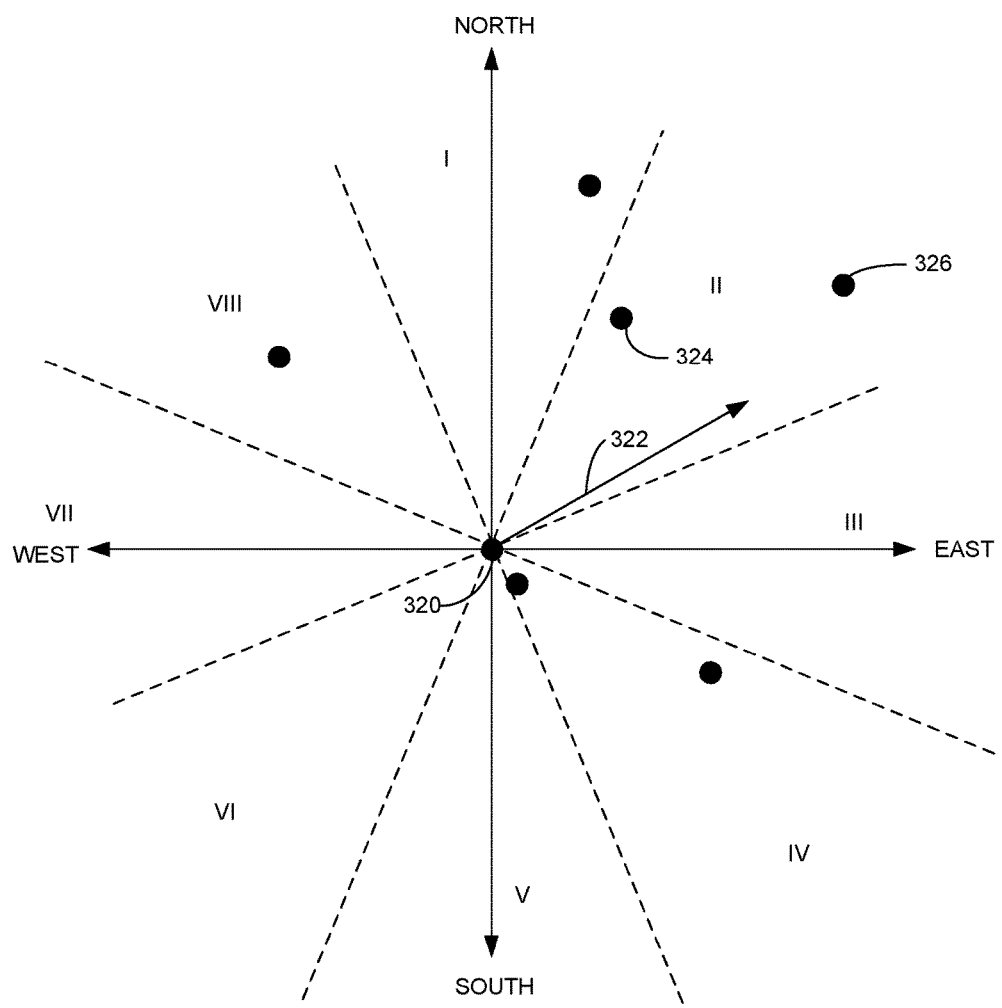
FIG. 3B presents a diagram illustrating one approach for selecting receiving mobile devices, in accordance with an embodiment of the present invention.

FIG. 3B presents a diagram illustrating one approach for selecting receiving mobile devices, in accordance with an embodiment of the present invention. As in FIG. 3A, the black dots in FIG. 3B represent mobile devices coupled to the server. In FIG. 3B, using the location of a transmitting mobile device 320 as a reference point, the entire plane is portioned into multiple regions, regions I-VIII, as indicated by the dashed lines. Note that the partition can be arbitrary and the number of regions can be more or fewer than 8. For example, it is possible to partition the plane into 4 or 16 regions. In the example shown in FIG. 3B, each partitioned region represents a well-known directional range. For example, region I represents the north, region II represents the north-east, region III represents the east, etc. In practice, these predefined regions do not need to correspond to known directional ranges. Once the regions are predefined, the system may determine a region to which the reference ray (which is determined based on the orientation of the transmitting mobile device) belongs. In the example shown in FIG. 3B, the reference ray of transmitting mobile device 320 (as indicated by an arrow 322) belongs to region II. As a result, any mobile device located within region II, such as mobile device 324 or 326, can be selected as a receiving mobile device. Because the partition of the plane is performed beforehand, the server no longer needs to find out the relative direction of a candidate mobile device from the transmitting mobile device. Instead, the server only needs to determine whether the candidate mobile device is within a particular region, thus simplifying the process of selecting receiving mobile devices.

Predefining the partitions also makes it possible for the transmitting mobile device to send an information-transmitting request without including its own orientation. Instead, the request may specify one or more predefined regions. Accordingly, the server can select receiving mobile devices located in the specified regions. For example, the request may specify region I (or north, as shown in FIG. 3B). Upon receiving such a request, the server will use the transmitting mobile device as an origin to perform partitioning, and select mobile devices that are located within the specified regions. Alternatively, the server may use an algorithm to determine which regions to use when selecting receiving mobile devices. For example, the server may randomly select a region, or the server may select a region based on the number of coupled mobile devices in each region.

In the example shown in FIGS. 3A and 3B, the size of the region within which the receiving mobile devices are located is not specified. In theory, it can be unlimited, because the server does not impose a limitation on the distance between the transmitting mobile device and the receiving mobile device. However, in practice, the server may set other limitations when selecting the receiving mobile devices in order to limit the number of receiving mobile devices. For example, for mobile devices that satisfy the directional requirement (i.e., they are within the determined region), the server may only select mobile devices whose distance from the transmitting mobile device is within a predetermined range. Alternatively, the server may only select mobile devices that are within the city limit, inside a particular state, or inside a particular country.

Considering most users are only interested in exchanging information with people they know, such as people on their contact list, in some embodiments, the server may additionally use the contact list and/or communication history of the transmitting mobile device as criteria for selecting receiving mobile devices. Among all mobile devices that satisfy the directional criteria (e.g., they are located within a particular region determined based on the orientation of the transmitting mobile device), the server may only select mobile devices that are associated with the transmitting mobile device. There are various criteria that can be used to determine whether a candidate mobile device is associated with the transmitting mobile device, including but not limited to: whether the candidate mobile device is on the contact list of the transmitting mobile device or vice versa, and whether there is a previous communication between these two devices. In some embodiments, the information-transmitting request may also specify a user relationship. For example, a user's contact list may include various groups, such as friends, family members, colleagues, business associations, neighbors, etc., and an information-transmitting request can specify one or more of these contact groups. Accordingly, the server may select mobile devices based on whether they belong to the specified contact groups. For example, in FIG. 3B, mobile device 324 may belong to the friend group of transmitting mobile device 320, whereas mobile device 326 may belong to the colleague group of transmitting mobile device 320. If mobile device 320 specifies in the information-transmitting request that the receiving mobile device should belong to the friend group, the server will only select mobile device 324 as the receiving mobile device.

Figure 4:
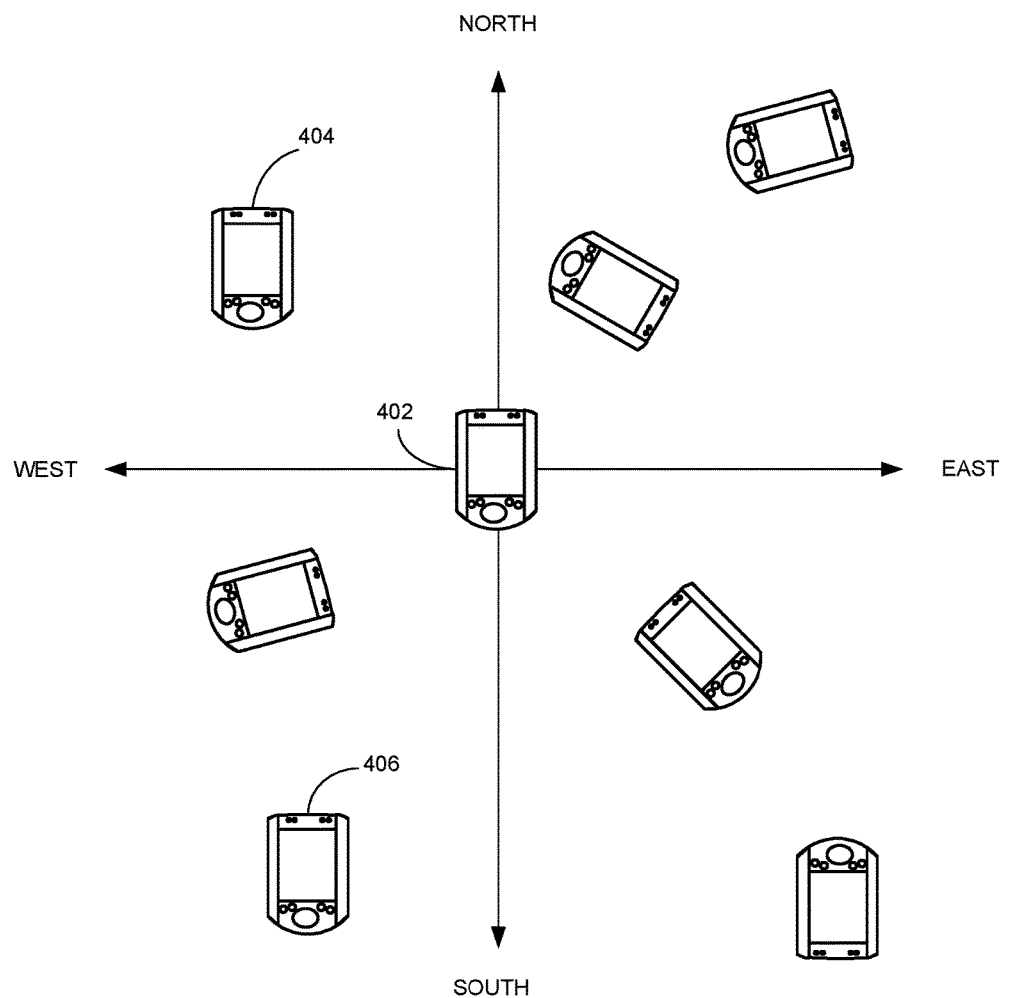
FIG. 4 presents a diagram illustrating one approach for selecting receiving mobile devices, in accordance with an embodiment of the present invention.

In addition to using the locations of other mobile device, in some embodiments, the server may also use the orientations of the other mobile devices as a criterion for selecting receiving mobile devices. For example, the server may obtain orientation information of the other mobile devices, and select those mobile devices having a similar orientation as the transmitting mobile device as receiving mobile devices. FIG. 4 presents a diagram illustrating one approach for selecting receiving mobile devices, in accordance with an embodiment of the present invention. In the example shown in FIG. 4, the orientation of transmitting mobile device 402 is pointed toward north, and there are multiple other mobile devices that are coupled to the server. The other mobile devices are oriented in various ways. During operation, transmitting mobile device 402 can send an information-transmitting request, and include its own orientation (e.g., north) in the request. Upon receiving the request, the server obtains orientation information of the other mobile devices, and selects mobile devices that have the same northern orientation, such as mobile devices 404 and 406, even though the location of these devices may be very different relative to transmitting mobile device 402. In this example, mobile device 404 is located to the northwest of transmitting mobile device 402, whereas mobile device 406 is located substantially to the south of transmitting mobile device 402. Note that it may be difficult to identify mobile devices that have the exact same orientation as the transmitting mobile device; hence, in some embodiments, the orientation of the selected mobile device may be slightly different from the orientation of the transmitting mobile device, as long as such a difference is within a predetermined range. For example, the orientation of transmitting mobile device 402 can be expressed using its azimuth as 0° or 360°, the azimuth of a selected receiving mobile device can be between ±δ° or between 360°±δ°, with δ being a predefined small number.

Figure 5:
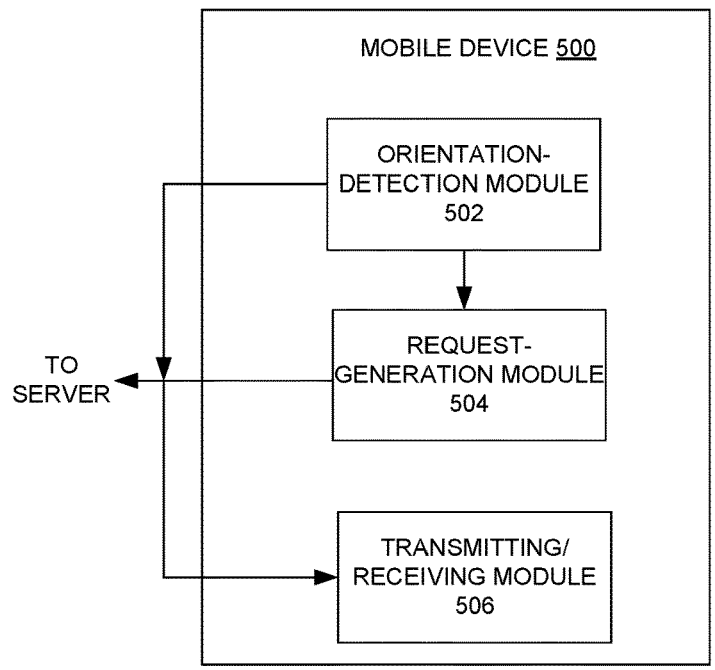
FIG. 5 presents a diagram illustrating the exemplary architecture of a mobile device, in accordance with an embodiment of the present invention.

FIG. 5 presents a diagram illustrating the exemplary architecture of a mobile device, in accordance with an embodiment of the present invention. In FIG. 5, mobile device 500 includes an orientation-detection module 502, a request-generation module 504, and a transmitting/receiving module 506. Orientation-detection module 502 is responsible for detecting the orientation of mobile device 502, and can include one or more of: an accelerometer, a gyroscope, and an electronic compass. In some embodiments, orientation-detection module 502 can include a three-axis electronic compass with tilt compensation. Request-generation module 504 is responsible for generating an information-transmitting request. When generating the information-transmitting request, request-generation module 504 typically does not specify a receiving mobile device. In some embodiments, request-generation module 504 includes the orientation of mobile device 502 in the generated request. Alternatively, instead of including the orientation of mobile device 502 in the generated request, request-generation module 504 may generate a request that specifies an orientation range. Request-generation module 504 can generate the request in response to a simple user operation, such as a single tap on the touchscreen or a shaking of the mobile device. Transmitting/receiving module 506 is responsible for communication between mobile device 502 and the server. It can transmit the request to the server, and in the event of mobile device 502 being selected as a receiving device, receive information from the server.

Figure 6:
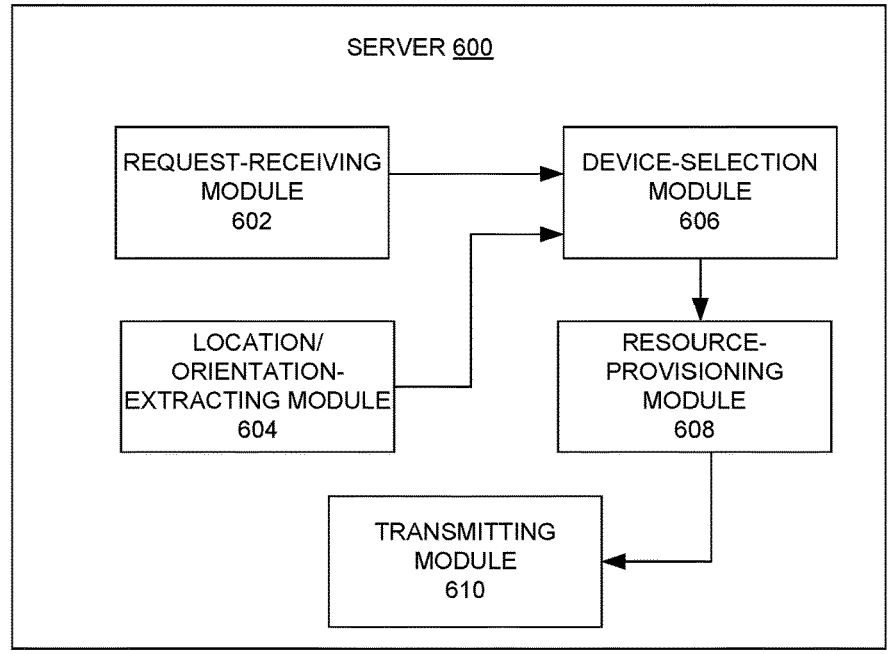
FIG. 6 presents a diagram illustrating the exemplary architecture of a server, in accordance with an embodiment of the present invention.

FIG. 6 presents a diagram illustrating the exemplary architecture of a server, in accordance with an embodiment of the present invention. In FIG. 6, server 600 includes a request-receiving module 602, a location/orientation-extracting module 604, a device-selection module 606, a resource-provisioning module 608, and a transmitting module 610.

Request-receiving module 602 is responsible for receiving an information-transmitting request. Such a request can be received from a mobile device or from other applications running on server 600. Location/orientation-extracting module 604 is responsible for extracting location and/or orientation information associated with mobile devices that are currently coupled to the server. Such information can be extracted by interfacing with the GPS module and orientation-detection module (e.g., the electronic compass) equipped on the mobile devices. Device-selection module 606 is responsible for selecting mobile devices for receiving information. Device-selection module 606 can select the receiving mobile devices based on various types of information, including but not limited to: the location of the transmitting mobile device, the orientation of the transmitting mobile device, the location of the candidate receiving mobile devices, the orientation of the candidate receiving mobile devices, the association between the transmitting mobile device and the candidate receiving mobile devices, and any combination thereof.

Resource-provisioning module 608 is responsible for provisioning available resources to the selected mobile devices. The resources can include, but are not limited to: cash rewards (if the mobile devices are linked to a financial account), gift certificates (which can be used to exchange real-life merchandise), virtual currency, virtual merchandise, and any combination thereof. More specifically, resource-provisioning module 608 places the transmitting mobile device (if existing) and the selected receiving mobile devices into a group, and provisions resources for the group based on the total resources and the number of devices in the group. Note that the resources provisioned for a group are less than or equal to the total available resources. Depending on the application, resource-provisioning module 608 can use different criteria to provision resources for a group. If the application is intended for distributing benefits (typically related to certain holidays), meaning that each participating user expects the same amount of resources, resource-provisioning module 608 may provision the group with an amount of resources proportional to the number of devices in the group. In other words, a group with more devices will be provisioned with more resources than a group with fewer devices. On the other hand, if the application is for a lucky draw, meaning that only a lucky few can receive a large amount of resources, resource-provisioning module 608 may provision the group with an amount of resources inversely proportional to the number of devices in the group. In other words, a group with fewer devices will be provisioned with more resources than a group with more devices.

In addition to provisioning the group, resource-provisioning module 608 is also responsible for provisioning resources for each member of the group. The resources provisioned to a member should not exceed the resources provisioned for the group. In some embodiments, resource-provisioning module 608 may equally divide the group resources among the group members. In some embodiments, resource-provisioning module 608 may distribute the group resources among group members based on user rankings. For example, users with higher rankings (which can be determined based on various criteria defined by the user or by the system) can obtain more resources.

Figure 7:
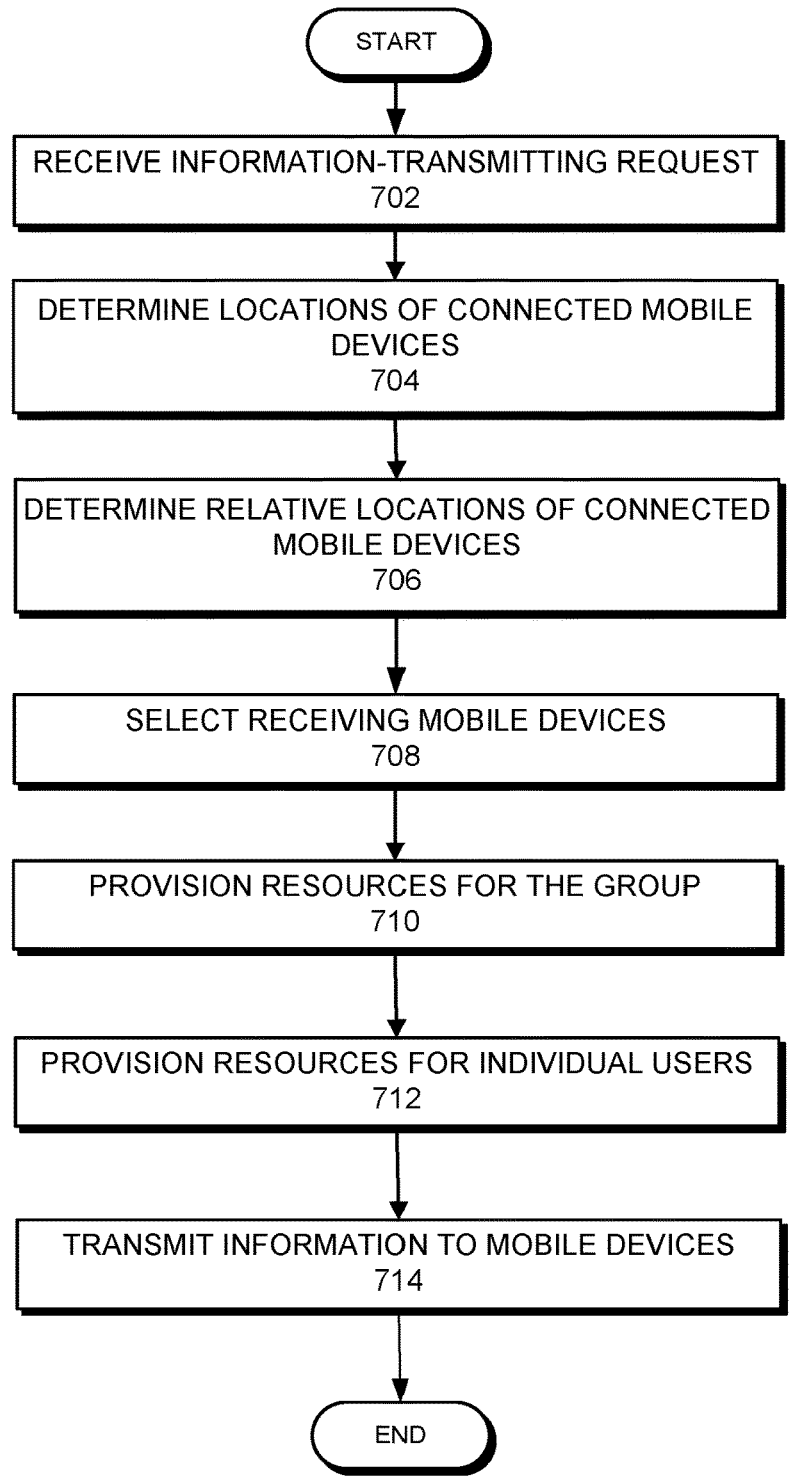
FIG. 7 presents a flowchart illustrating an exemplary process for transmitting information, in accordance with an embodiment of the present invention.

FIG. 7 presents a flowchart illustrating an exemplary process for transmitting information, in accordance with an embodiment of the present invention. During operation, a server receives an information-transmitting request from a transmitting mobile device (operation 702). Note that the information-transmitting request does not identify (either by name or by address) any receiving mobile device. In some embodiments, the information-transmitting request may include orientation information associated with the transmitting mobile device. In other words, the information-transmitting request can indicate the direction in which the transmitting mobile device is pointed. Such orientation information can be obtained from an electronic compass equipped on the mobile device. For example, when a user located in city A intends to transmit information to a group of users located in city B, the user in city A can point his mobile device to the direction of city B. The orientation of the user's mobile device is included in the information-transmitting request to allow the server to determine that the mobile device is pointed toward city B.

In alternative embodiments, the information-transmitting request does not include the information-transmitting request. The server can obtain the orientation of the mobile device by separately querying the mobile device, or the server does not need the orientation information of the mobile device.

The information-transmitting request can also specify the type and/or quantity (if applicable) of the to-be-transmitted information, which can include but is not limited to: monetary gifts, certificates for real-life merchandise, virtual currencies or merchandise, marketing materials (e.g., advertisements, coupons, etc.), and various digital information (e.g., text, photos, video and audio files, etc.). In addition, the system may allow the user to edit the information-transmitting request. For example, the user can include a message (such as holiday greetings, notifications, etc.) in the information-transmitting request.

Subsequent to receiving the request, the server determines the location of the transmitting mobile device and locations of other mobile devices that are currently connected to the server (operation 704). In some embodiments, the server may need to query the location sensor (such as the GPS module) equipped on the mobile devices in order to obtain their locations. Such query can be performed on demand or periodically. Alternatively, a mobile device connected to the server may periodically update its location information.

The server then determines the relative locations of the other connected mobile devices based on the current location of the transmitting mobile device and the current locations of the other connected mobile devices (operation 706). The relative location can include a direction to the transmitting mobile device and/or a distance to the transmitting mobile device. For example, the server may determine that a mobile device is 50 miles north of the transmitting mobile device.

Subsequently, the server selects, from the connected other mobile devices, one or more mobile devices as receiving mobile devices based on the orientation of the transmitting mobile device, the relative locations and/or orientations of the other connected mobile devices (operation 708). In some embodiments, the system may select one or more mobile devices as receiving mobile devices if it determines that the relative locations of the selected mobile devices are substantially the same as the orientation of the transmitting mobile device. For example, if the transmitting mobile device is pointing to the north-east, mobile devices that are north-east of the transmitting mobile device can be selected as the receiving devices. In alternative embodiments, the system may select one or more predefined regions as receiving zones (regardless of the orientation of the transmitting mobile device), and mobiles devices located within the receiving zones can be selected as the receiving devices. For example, the system may pre-select east, north-east, and north regions (e.g., regions III, II, and I shown in FIG. 3B), and mobile devices whose relative locations are within those regions are selected as the receiving mobile devices. In further embodiments, the server may also apply a filter based on the relationship between users of the other connected mobile devices and the user of the transmitting mobile device. For example, the server may only select those mobile devices that are on the contact list of the transmitting mobile device as receiving devices.

Alternatively, the server may allow the user to determine the relative locations of the receiving devices. One way to do so is that the server can present to the user (using a map similar to the one shown in FIG. 3B), the relative locations of the other mobile devices. The user may determine, based on the map and certain user- or system-defined criteria, which direction or zone should be used by the server for selecting receiving devices. For example, there may be more mobile devices located to the north of the transmitting mobile device than to the south of the transmitting mobile device. If the transmitting user intends to have more additional users receive information, the transmitting user can specify that the server should select receiving devices that are north of himself, and vice versa.

Once the receiving mobile devices are selected, the transmitting mobile device and the selected receiving mobile devices are grouped into one or more groups, and members within a group can communicate with the server as a group. In some embodiments, the mobile devices within the same group do not have information regarding the identification of their group members. Only the server maintains such information. If the to-be-transmitted information includes physical or virtual resources, the server can provision resources for the group (operation 710). In some embodiments, the system provisions a fixed amount of resources for each group. In some embodiments, the amount of the resources provisioned for a group is determined based on the number of mobile devices/users included in the group. Subsequently, the server provisions resources for individual users in the group (operation 712). The server may provide the same amount of resources to each group member, or the server may provide more resources to members with a higher ranking.

Subsequently, the server transmits the information (e.g., provisioned resources) to each member in the group (operation 714). If the provisioned resources include cash rewards, the transmitted information may include information that is needed for completing an account transfer, such as financial account number, amount, authorization code, etc.

FIG. 8 presents a diagram illustrating a resource-provisioning example, in accordance with an embodiment of the present invention. In FIG. 8, based on the locations of mobile devices relative to a transmitting mobile device, the system selects a number of mobile devices (e.g., devices A, B, C, D, etc.) and groups them into two groups (group 001 and group 002). Group 001 includes mobile devices that are to the east of the transmitting mobile device, and group 002 includes mobile devices that are to the north-east of the transmitting mobile device. Group 001 includes two group members, and group 002 includes 300 members.

In the example shown in FIG. 8, the server provisions each group based on their member number (i.e., a group having a larger member number receives more resources). Accordingly, group 001 is provisioned with a cash amount of $1000, and group 002 is provisioned with a cash amount of $60,000. The different groups may have different predefined rules for provisioning individual members. For example, the system may be configured to provision members in group 001 using a rule that provides higher ranked members with more resources. As a result, the higher ranked mobile device B receives $900, and the lower ranked mobile device A receives $100. The system may also be configured to provision members in group 002 using a rule that distributes the group resources evenly among its members. As a result, each member in group 002 receives $200 (60000/300=200).

Figure 9:
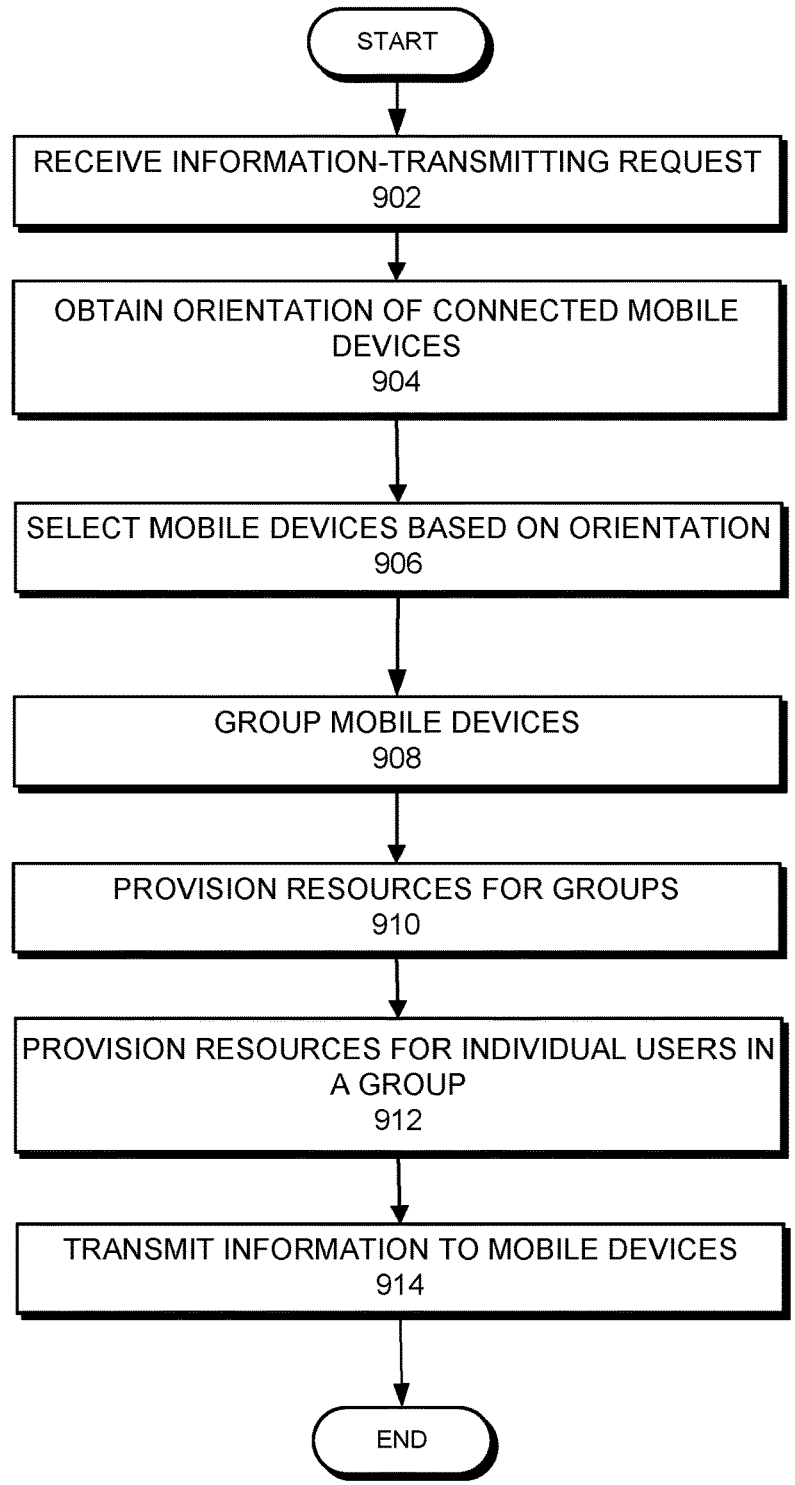
FIG. 9 presents a flowchart illustrating an exemplary process for transmitting information, in accordance with an embodiment of the present invention.

FIG. 9 presents a flowchart illustrating an exemplary process for transmitting information, in accordance with an embodiment of the present invention. During operation, a server receives an information-transmitting request (operation 902). The information-transmitting request can be sent from a mobile device (which can be referred to as the "transmitting mobile device") or from a program running on the server. In other words, a user can initialize the information-transmitting process by operating his mobile device (an in the case of a red envelope fission), or an administrator having access to the server can initialize the information-transmitting process (as in the case of a marketer distributing marketing materials).

The server obtains orientation information of all mobile devices that are connected to the server (operation 904). In some embodiments, the server queries the mobile devices to obtain their up-to-date orientation information in response to receiving the information-transmitting request. In some embodiments, the server may periodically query the mobile devices for their orientation, or the mobile devices may update their orientation information, periodically or when commanded by the user, to the server. The orientation information can have different granularities. In some embodiments, the orientation of a mobile device can be its azimuth rounded up to the nearest degree. In some embodiments, the orientation of a mobile device can one of the predefined directions (e.g., north, north-east, south, south-west, etc.) to which the mobile device is mostly aligned.

The server can then select mobile devices that have substantially the same orientation (operation 906), and place the selected mobile devices into a group (operation 908). If the information-transmitting request is initialized by a transmitting mobile device, the server may place other connected mobile devices that have the same orientation as the transmitting mobile device in a group. For server-initialized request, one or more groups can be formed. For example, the server may only form one group by selecting mobile devices pointing to the north, or the server may select all mobile devices and divide them into different groups based on their orientation.

Considering that the number of mobile devices that have similar orientations can be huge, in some embodiments, the server can apply a filter. The filter can be time based. For example, the system can use a time window (e.g., a 1-minute or 5-minute window) within which the mobile devices report their orientation as a filter. In this way, when selecting receiving mobile devices, the server can select those mobile devices that have reported their orientation to the server within a predetermined time window (e.g., within the last 5 minutes) and have similar orientations. This configuration allows a more active user control. For example, if multiple users want to form a group among themselves, they can pre-select a time, and at the pre-selected time, they can orient their mobile devices in a same direction and update their device orientation to the server. As a result, the server most likely will group them together because they meet both the time and orientation criteria. In addition to the time-base filter, the user relationship can also be used as a filtering condition. The time filter can also be used in the lucky draw application. For example, the server may select a narrow time window (e.g., a time window of one second or shorter around midnight New Year's Day) and a random well-defined orientation (e.g., an azimuth of 23°). Any user who orients his mobile device in that direction and updates its orientation to the server (which can be done by performing a simple operation on the device) within the time window will be the winner.

Subsequently, the server provisions the group (operation 910), provisions members within the group (operation 912), and transmits the appropriate information to the members of the group (operation 914). Operations 910-914 are similar to operations 710-714.

Computer and Communication System

Figure 10:
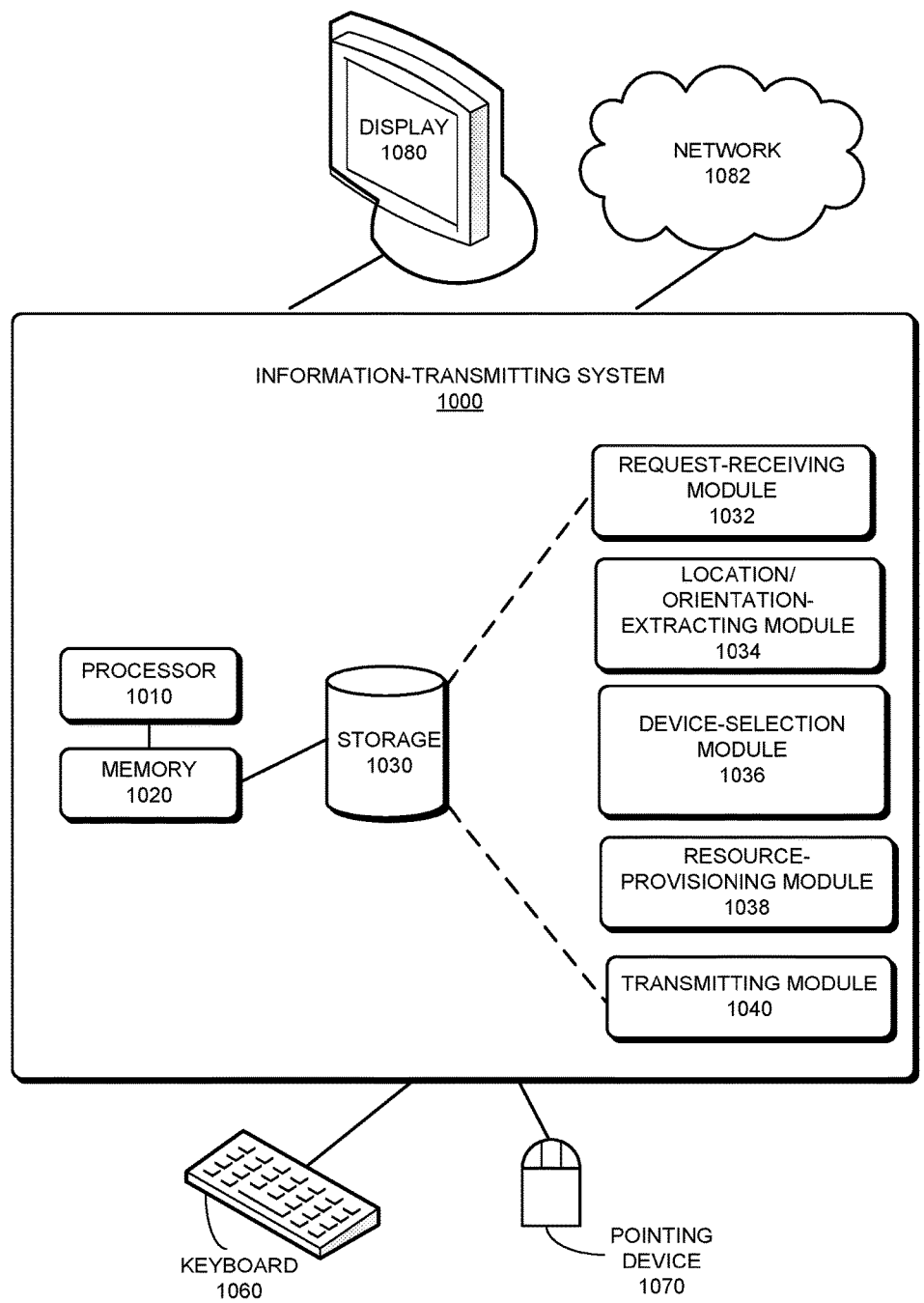
FIG. 10 illustrates an exemplary computer and communication system for transmitting information, in accordance with an embodiment of the present invention.

FIG. 10 illustrates an exemplary computer and communication system for transmitting information, in accordance with an embodiment of the present invention. In FIG. 10, information-transmitting system 1000 includes a processor 1010, a memory 1020, and a storage 1030. Storage 1030 typically stores instructions that can be loaded into memory 1020 and executed by processor 1010 to perform the methods mentioned above. In one embodiment, the instructions in storage 1030 can implement a request-receiving module 1032, a location/orientation-extracting module 1034, a device-selection module 1036, a resource-provisioning module 1038, and a transmitting module 1040, all of which can be in communication with each other through various means.

In some embodiments, modules 1032, 1034, 1036, 1038, and 1040 can be partially or entirely implemented in hardware and can be part of processor 1010. Further, in some embodiments, the system may not include a separate processor and memory. Instead, in addition to performing their specific tasks, modules 1032, 1034, 1036, 1038, and 1040, either separately or in concert, may be part of general- or special-purpose computation engines.

Storage 1030 stores programs to be executed by processor 1010. Specifically, storage 1030 stores a program that implements a system (application) for the transaction platform. During operation, the application program can be loaded from storage 1030 into memory 1020 and executed by processor 1410. As a result, system 1000 can perform the functions described above. System 1000 can be coupled to an optional display 1080 (which can be a touchscreen display), keyboard 1060, and pointing device 1070, and can also be coupled via one or more network interfaces to network 1082.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

What is claimed is:

1. A computer-executable method, comprising:
   receiving, by a server from an initial mobile device, a request for transmitting information, wherein the request does not specify a mobile device for receiving the to-be-transmitted information;
   obtaining location information, orientation information, or both, associated with the initial mobile device;
   obtaining location information, orientation information, or both, associated with a plurality of mobile devices;
   selecting from the plurality of mobile devices a subset of mobile devices based on the location information, orientation information, or both, associated with the initial mobile device and location information, orientation information, or both, associated with the plurality of mobile devices; and
   transmitting the information to the selected subset of mobile devices.

2. The method of claim 1, wherein selecting the subset of mobile devices involves:
   defining a region based on the location and orientation of the initial mobile device; and
   identifying mobile devices located within the defined region.

3. The method of claim 2, wherein defining the region involves:
   using the location of the initial mobile device as an origin;
   defining a first ray that starts from the origin and aligns to the orientation of the initial mobile device; and
   defining the region in a such a way that an angle formed between the first ray and a straight line connecting any point in the region and the origin is less than a predetermined threshold.

4. The method of claim 1, wherein selecting the subset of mobile devices involves:
   using the location of the initial mobile device as an origin;
   defining a plurality of zones having a common vertex at the origin; and
   identifying mobile devices located within one or more of the defined zones.

5. The method of claim 1, wherein selecting the subset of mobile devices further involves determining an association between a respective mobile device and the initial mobile device.

6. The method of claim 1, wherein selecting the subset of mobile devices involves identifying mobile devices whose orientation is substantially same as the orientation of the initial mobile device.

7. The method of claim 1, wherein the information includes information for distributing resources, and wherein the method further comprises:
   placing the selected subset of mobile devices into a group;
   provisioning resources for the group based on a total number of mobile devices in the group; and
   provisioning resources for each mobile device in the group.

8. A computer server system, comprising:
   a processor;
   a receiving module configured to receive, from an initial mobile device, a request for transmitting information, wherein the request does not specify a mobile device for receiving the to-be-transmitted information;
   an obtaining module configured to obtain location information, orientation information, or both, associated with the initial mobile device and location information, orientation information, or both, associated with a plurality of mobile devices;
   a selection module configured to select from the plurality of mobile devices a subset of mobile devices based on the location information, orientation information, or both, associated with the initial mobile device and the location information, orientation information, or both, associated with the plurality of mobile devices; and
   a transmission module configured to transmit the information to the selected subset of mobile devices.

9. The computer server system of claim 8, wherein while selecting the subset of mobile devices, the selection module is configured to:
   define a region based on the location and orientation of the initial mobile device; and
   identify mobile devices located within the defined region.

10. The computer server system of claim 9, wherein defining the region involves:
    using the location of the initial mobile device as an origin;
    defining a first ray that starts from the origin and aligns to the orientation of the initial mobile device; and defining the region in a such a way that an angle formed between the first ray and a straight line connecting any point in the region and the origin is less than a predetermined threshold.

11. The computer server system of claim 8, wherein while selecting the subset of mobile devices, the selection module is configured to:
use the location of the initial mobile device as an origin;
define a plurality of zones having a common vertex at the origin; and
identify mobile devices located within one or more of the defined zones.

12. The computer server system of claim 8, wherein while selecting the subset of mobile devices, the selection module is configured to determine an association between a respective mobile device and the initial mobile device.

13. The computer server system of claim 8, wherein while selecting the subset of mobile devices, the selection module is configured to identify mobile devices whose orientation is substantially same as the orientation of the initial mobile device.

14. The computer server system of claim 8, wherein the information includes information for distributing resources, and wherein the server system further comprises:
a grouping module configured to place the selected subset if mobile devices into a group; and
a provisioning module configured to:
provision resources for the group based on a total number of mobile devices in the group; and
provision resources for each mobile device in the group.

15. A non-transitory computer-readable storage medium storing instructions that when executed by a computing device cause the computing device to perform a method, the method comprising:
receiving, by a server from an initial mobile device, a request for transmitting information, wherein the request does not specify a mobile device for receiving the to-be-transmitted information;
obtaining location information, orientation information, or both, associated with the initial mobile device;
obtaining location information, orientation information, or both, associated with a plurality of mobile devices;
selecting from the plurality of mobile devices a subset of mobile devices based on the location information, orientation information, or both, associated with the initial mobile device and the location information, orientation information, or both, associated with the plurality of mobile devices; and
transmitting the information to the selected subset of mobile devices.

16. The computer-readable storage medium of claim 15, wherein selecting the subset of mobile devices involves:
defining a region based on the location and orientation of the initial mobile device; and
identifying mobile devices located within the defined region.

17. The computer-readable storage medium of claim 15, wherein selecting the subset of mobile devices involves:
using the location of the initial mobile device as an origin;
defining a plurality of zones having a common vertex at the origin; and
identifying mobile devices located within one or more of the defined zones.

18. The computer-readable storage medium of claim 15, wherein selecting the subset of mobile devices further involves determining an association between a respective mobile device and the initial mobile device.

19. The computer-readable storage medium of claim 15, wherein selecting the subset of mobile devices involves identifying mobile devices whose orientation is substantially same as the orientation of the initial mobile device.

20. The computer-readable storage medium of claim 15, wherein the information includes information for distributing resources, and wherein the method further comprises:
placing the selected subset of mobile devices into a group;
provisioning resources for the group based on a total number of mobile devices in the group; and
provisioning resources for each mobile device in the group.

* * * * *